(12) United States Patent
Tompkins (10) Patent No.: US 7,914,015 B2
(45) Date of Patent: Mar. 29, 2011

(54) WHEELED SHOPPING TOTE

(76) Inventor: Mary Tompkins, Honeoye Falls, NY (US)

( * ) Notice: Subject to any disclaimer, the term of this patent is extended or adjusted under 35 U.S.C. 154(b) by 759 days.

(21) Appl. No.: 11/551,085

(22) Filed: Oct. 19, 2006

(65) Prior Publication Data

US 2007/0090616 A1  Apr. 26, 2007

Related U.S. Application Data

(60) Provisional application No. 60/729,335, filed on Oct. 21, 2005.

(51) Int. Cl.
*B62B 1/00* (2006.01)

(52) U.S. Cl. .............. 280/47.18; 280/47.28; 280/655; 280/655.1; 280/47.24

(58) Field of Classification Search ............ 280/646, 280/655, 47.24, 42, 47.17, 47.26, 47.315, 280/651, DIG. 3
See application file for complete search history.

(56) References Cited

U.S. PATENT DOCUMENTS

| | | | | |
|---|---|---|---|---|
| 2,249,123 | A * | 7/1941 | Fleck et al. ............... 280/645 |
| 2,757,935 | A * | 8/1956 | Antonio ................. 280/654 |
| 2,775,464 | A * | 12/1956 | Williamson ............... 280/38 |
| 2,890,060 | A * | 6/1959 | Ott et al. ................. 280/42 |
| 3,861,633 | A * | 1/1975 | Rappleye et al. .......... 248/290.1 |
| 4,181,463 | A * | 1/1980 | Mooney ................. 414/490 |
| 4,221,354 | A | 9/1980 | Kempers |
| 4,407,521 | A * | 10/1983 | Zeitlin .................. 280/655 |
| 4,830,385 | A * | 5/1989 | Wallick et al. ............. 280/35 |
| RE32,966 | E | 6/1989 | Miller et al. |
| 4,915,408 | A * | 4/1990 | Clemence et al. .......... 280/655 |
| 4,953,888 | A | 9/1990 | Stein |
| 5,024,455 | A | 6/1991 | Schrecongost |
| 5,464,104 | A * | 11/1995 | McArthur ............... 211/133.3 |
| 5,501,308 | A * | 3/1996 | King ................... 190/102 |
| 5,678,842 | A * | 10/1997 | Hook et al. .............. 280/646 |
| 5,697,624 | A * | 12/1997 | Faraj ................... 280/47.19 |
| 5,755,477 | A | 5/1998 | McKnight |
| 5,845,951 | A | 12/1998 | Webb |
| 5,853,092 | A * | 12/1998 | Goodman et al. .......... 211/70.6 |
| 5,951,037 | A | 9/1999 | Hsieh et al. |
| 6,081,967 | A | 7/2000 | Chang |
| 6,092,817 | A | 7/2000 | Kilmer |
| 6,109,579 | A * | 8/2000 | Huang ................. 248/294.1 |
| 6,152,463 | A * | 11/2000 | Wu .................... 280/47.17 |
| 6,367,746 | B1 | 4/2002 | Webb et al. |
| 6,565,103 | B2 * | 5/2003 | Wilson .................. 280/47.24 |
| 6,575,482 | B2 * | 6/2003 | Dombroskie et al. ....... 280/47.24 |
| 6,880,851 | B1 * | 4/2005 | Summers et al. .......... 280/652 |
| 7,258,352 | B2 * | 8/2007 | Odgers ................. 280/47.28 |

OTHER PUBLICATIONS

Parker, The Garden Cart, www.parkercarts.com/images/carts/larger/garden2.jpg, Jul. 11, 2006.

* cited by examiner

*Primary Examiner* — J. Allen Shriver, II
*Assistant Examiner* — Bridget Avery
(74) *Attorney, Agent, or Firm* — Woods Oviatt Gilman LLP (57) ABSTRACT

A shopping tote including a vertical support structure having one or more hooks for suspending bags therefrom enables carrying of shopping bags and/or boxes in an easy and convenient manner. A platform may be provided for placing of boxed items. The tote may be quickly changed between a compact storage condition and an in-use condition. When in the storage condition, the tote is of a size allowing carrying thereof alone or in a backpack, briefcase or purse, for example.

5 Claims, 7 Drawing Sheets

WHEELED SHOPPING TOTE

REFERENCE TO RELATED APPLICATION

This application claims the benefit of prior provisional application Ser. No. 60/729,335 filed on Oct. 21, 2005.

BACKGROUND OF THE INVENTION

The present invention generally relates to hand-pulled carts or totes. The present invention more particularly relates to a hand-pulled, wheeled tote capable of easily transporting many bags and boxed items and which is collapsible or foldable to a size that may be stored and carried alone or in a bag, backpack, briefcase or purse, for example, such that the tote is readily available to a shopper when needed.

When shopping, shoppers typically accumulate many bags and/or boxed items during a single shopping trip. As the number of bags and boxes continue to grow in number during a shopping trip, shoppers struggle under the heavy load and become quickly tired and aggravated with the unmanageability of handling multiple bagged and boxed items. This problem is exacerbated if the shopper has any physical ailments, e.g., back or hand problems. Some shoppers are known to make trips to their car to unload the bags and boxes and then return to the stores for more shopping, or leave the mall altogether in frustration. Shoppers with small children in strollers sometimes use the strollers for carrying the bags and boxes however, this is a dangerous practice since the stroller is not designed to carry heavy, uneven loads and may tip over. Plastic bags placed near the child are also a suffocation hazard.

Wheeled carts are known for carrying luggage through an airport, for example, yet these carts are typically heavy and bulky even in their collapsed positions. Furthermore, such carts are designed to only hold generally rectangular shaped and rigid sided pieces of luggage on their platform, usually secured to the cart with a bungee cord. These carts are not designed to hold multiple bags by their handles. Attempts to hang bags over the top of the handle usually result in the load becoming unbalanced resulting in the cart tipping over. If the bags are secured under the bungee cord on top of a piece of luggage sitting on the platform, the bag may slip out from beneath the bungee and fall to the floor. As such, these types of wheeled luggage carts are simply not suitable for use in a shopping environment where many purchased items are carried in handled, plastic or paper bags. Furthermore, due to their weight and large size even in the folded position, these types of carts are not readily carried by a person for use when needed during a shopping trip.

There therefore exists a need for a wheeled tote for shoppers which is foldable to a very compact size and capable of carrying multiple handled bags and boxed items in a safe and secure manner. It would furthermore be desirable to provide a tote that may be wheeled along with a wheelchair or stroller, for example.

SUMMARY OF THE INVENTION

The present invention successfully addresses the above needs by providing a light-weight, wheeled tote for shoppers which can carry multiple bags and boxes in a safe and secure manner. The tote is foldable to a compact size capable of being carried alone or in a bag, backpack, briefcase or purse, for example. When needed, the tote is quickly opened and ready for use.

In one embodiment, the tote includes a platform attached to one or more wheels. The platform may comprise two or more sections that may be folded or otherwise positioned in an overlying manner with respect to one another when the tote is in the stored condition or when a smaller platform size is desirable due to space constraints of a shopping aisle, for example.

The tote includes one or more shafts or vertical support structures which attach to the wheels. A handle is formed or otherwise attached to the end of the vertical support to enable a shopper to pull (or push) the tote with a single hand. The vertical support may telescope, fold or otherwise be adjusted to a smaller size when converting the tote to its storage condition. The vertical support may be adjustable between different heights when changed to the in-use condition to accommodate the desires and needs of the particular shopper.

The shaft or shafts may further include one or more hooks, clasps or other structures (hereinafter collectively referred to as hooks) operable to suspend a bag therefrom. In one embodiment, the hooks retract into the vertical support when the support is moved to its stored condition. The books may be biased in the extended position by a spring, for example, such that the hooks automatically extend upon opening the vertical supports to their in-use condition. In another embodiment, the hooks are recessed with respect to the outer wall of the vertical support yet easily accessible to position and hang a bag thereon.

The tote may include one or more stabilizing members if needed to prevent the tote from tipping over when the shopper places the tote to a free-standing, stationary position. The stabilizing member may be manually or automatically retractable or foldable when the tote is being wheeled or moved to its storage condition.

In another embodiment, the tote may be adapted to attach to another wheeled item such as a stroller or wheelchair, for example. In this embodiment, rather than pulling the tote by its handle, the tote may be pulled along by the wheeled item.

DETAILED DESCRIPTION

Referring now to the drawing, there is seen in FIGS. 1-7B a first embodiment of the inventive tote designated generally by the reference numeral 10. As discussed above, tote 10 provides a light-weight, wheeled tote for a shopper 12 to easily transport multiple bags and/or boxes 14 in a safe and secure manner. Tote 10 is foldable to a compact size capable of being carried alone or in a bag, backpack, briefcase or purse, for example (see FIG. 2). When needed, tote 10 is quickly opened and ready for use as described more fully below.

Tote 10 basically includes a vertical support structure 28 connected to one or more wheels 18 which allow tote 10 to be wheeled by shopper 12. Wheels 18 may have a common axle 19 or may be of the caster or swivel type to allow tight cornering and turning of tote 10.

Tote 10 may further include a platform 20 which is preferably substantially flat and square or rectangular in outline although other shapes are of course possible. Platform 20 includes a top surface 22 for supporting articles such as boxes and bags, for example. Surface 22 may be textured if desired to provide additional friction between the articles and surface, and thereby help prevent the articles from sliding off the platform 20.

Figure 3:
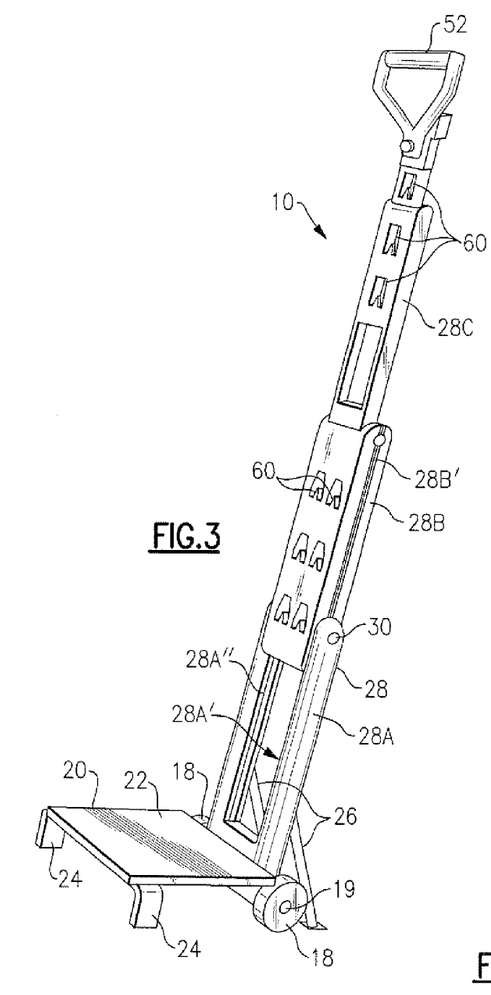
FIG. 3 is a perspective view of the tote in the in-use condition.
Figure 4:
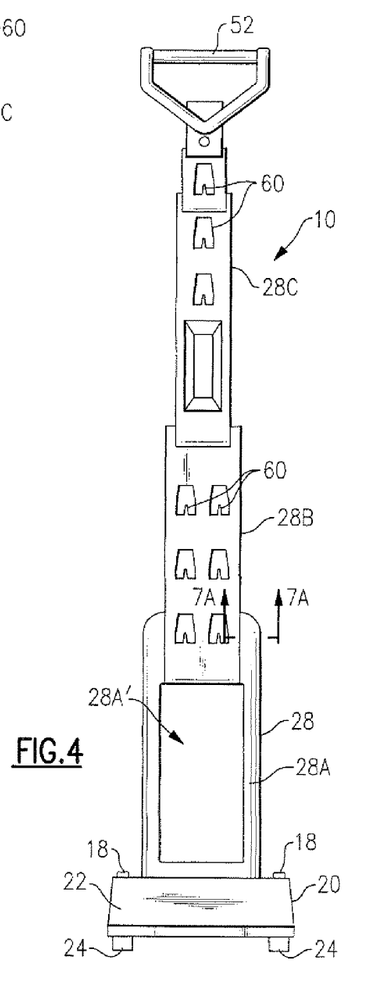
FIG. 4 is a front, elevational view thereof.

As seen in FIGS. 3 and 4, platform 20 may be provided with one or more platform legs 24 to maintain platform 20 in a generally parallel orientation above the floor when tote 10 is placed in an in-use, standing position. Legs 24 may be foldable against platform 20 when tote 10 is changed to the stored position seen in FIGS. 2 and 6. Platform 20 itself is foldable against vertical support 28 when tote 10 is changed to the storage condition seen in FIGS. 2 and 5-7. Platform 20 may furthermore be foldable or otherwise adjustable to a smaller size as will be further described below with respect to the embodiment of FIGS. 9-12.

As seen in FIG. 3, one or more rear stabilizing legs 26 may be provided if the load of bags and/or boxes would otherwise cause rearward tipping (away from platform 20) of tote 10 when placed in the stationary, standing position. Legs 26 may be folded or retracted against vertical support 28 when not needed.

Although not shown, one or more relatively short, vertical walls may be provided in any desired arrangement on platform 20 (e.g., to provide one or more compartments) to further secure articles supported thereon.

Figures 5, 6, 7A, 7B:
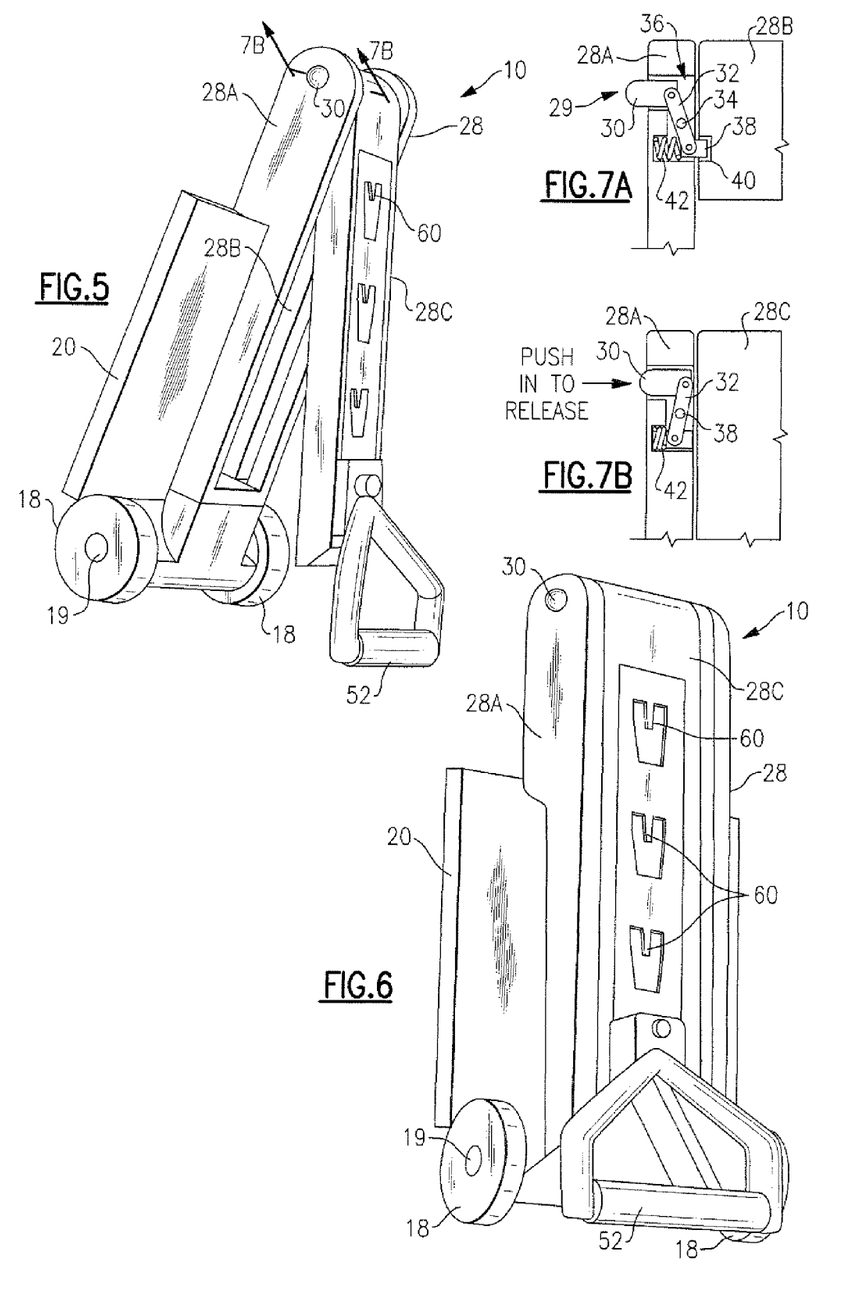
FIG. 5 is a perspective view showing the tote in a partly folded condition.
FIG. 6 is a rear perspective view showing the tote in the fully stored condition.
FIG. 7A is a cross-sectional view of the releasable locking mechanism as taken along the line 7A-7A in FIG. 4.
FIG. 7B is a cross-sectional view of the releasable locking mechanism as taken along the line 7B-7B in FIG. 5.

As stated above, vertical support structure 28 directly or indirectly connects to wheels 18. In the embodiment of FIGS. 1-8, vertical support 28 includes a bottom section 28A, middle section 28B and a top section 28C. Bottom section 28A includes a central opening 28A' such that middle section 28B may slide downwardly into opening 28A' when it is desired to shorten the height of vertical support 28, or when tote 10 is changed to the stored condition seen in FIGS. 2, and 5-7. In this regard, the connection between bottom and middle sections 28A and 28B is selectively releasable through a suitable releasable attachment component 29 such as a spring-loaded button 30. As seen in FIGS. 7A and 7B, button 30 may be provided on a lever 32 which is pivotable about an axle pin 34 located in an opening 36 provided within bottom section 28A. Lever 32 includes a finger 38 that is formed to removably fit within an opening 40 formed in middle section 28B. A spring 42 is located within bottom section 28A opposite finger 38 and biases lever 32 in the engaged position seen in FIG. 7A. To release locking member 29, the shopper pushes against button 30 which causes lever 32 to pivot about pin 34 in the clockwise direction as seen in FIGS. 7A and B. This movement applies a force against spring 42 and retracts finger 38 from opening 40. This releases the attachment between bottom section 28A and middle section 28B such that the shopper may push middle section 28B toward bottom section 28A until middle section 28B comes to rest within opening 28A'. Once middle section 28B has been moved with respect to bottom section 28A, finger 38 is no longer aligned with opening 40 and cannot re-engage until the middle section is moved back to the extended position and finger 38 is in alignment with opening 40. When this occurs, finger 38 will automatically extend into opening 40 due to the bias of spring 42. Thus, when sections 28A and 28B are moved to the fully extended position seen in FIGS. 1, 3 and 4, button 30 is operable to automatically yet releasably lock these two sections in place.

Cooperatively formed tongue 28B' and groove 28A" may be provided on the facing surfaces of bottom and middle sections 28A, 28B (FIG. 3) to provide a track which guides the sliding movement of these sections toward and away from each other.

Top section 28C is connected to middle section 28B about a hinge 50 (FIG. 4) whereby top section 28C may be folded against bottom and middle sections 28A, 28B which have previously been closed together as seen best in FIGS. 5 and 6.

A handle 52 is attached to the top end 28C' of top section 28C to allow a shopper 12 to grasp and wheel tote 10 along a floor. Handle 52 may be of any shape or type and may include finger grips for case of gripping if desired.

Figure 1:
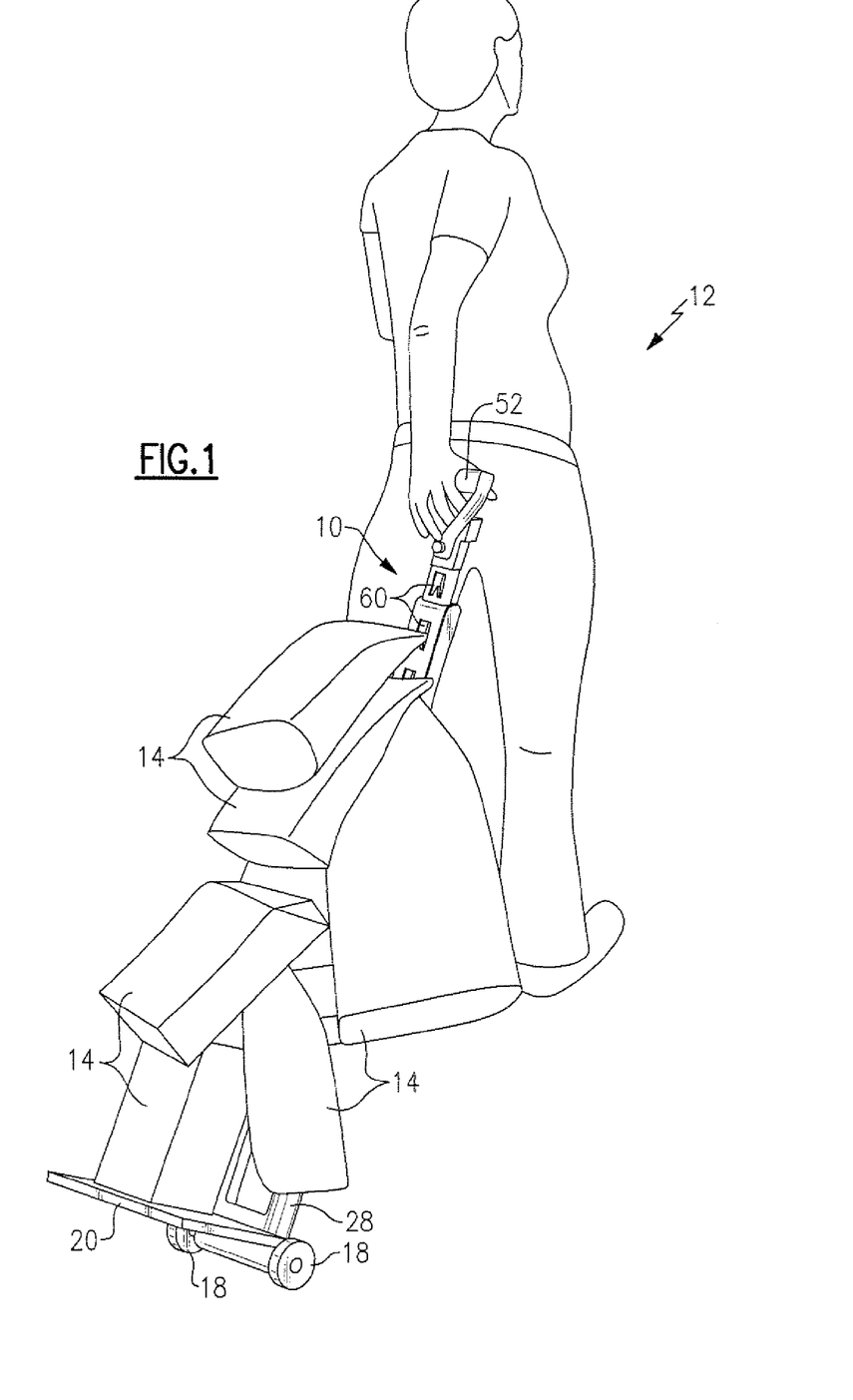
FIG. 1 is a perspective view of one embodiment of the tote in the in-use condition being wheeled behind a shopper.
Figure 2:
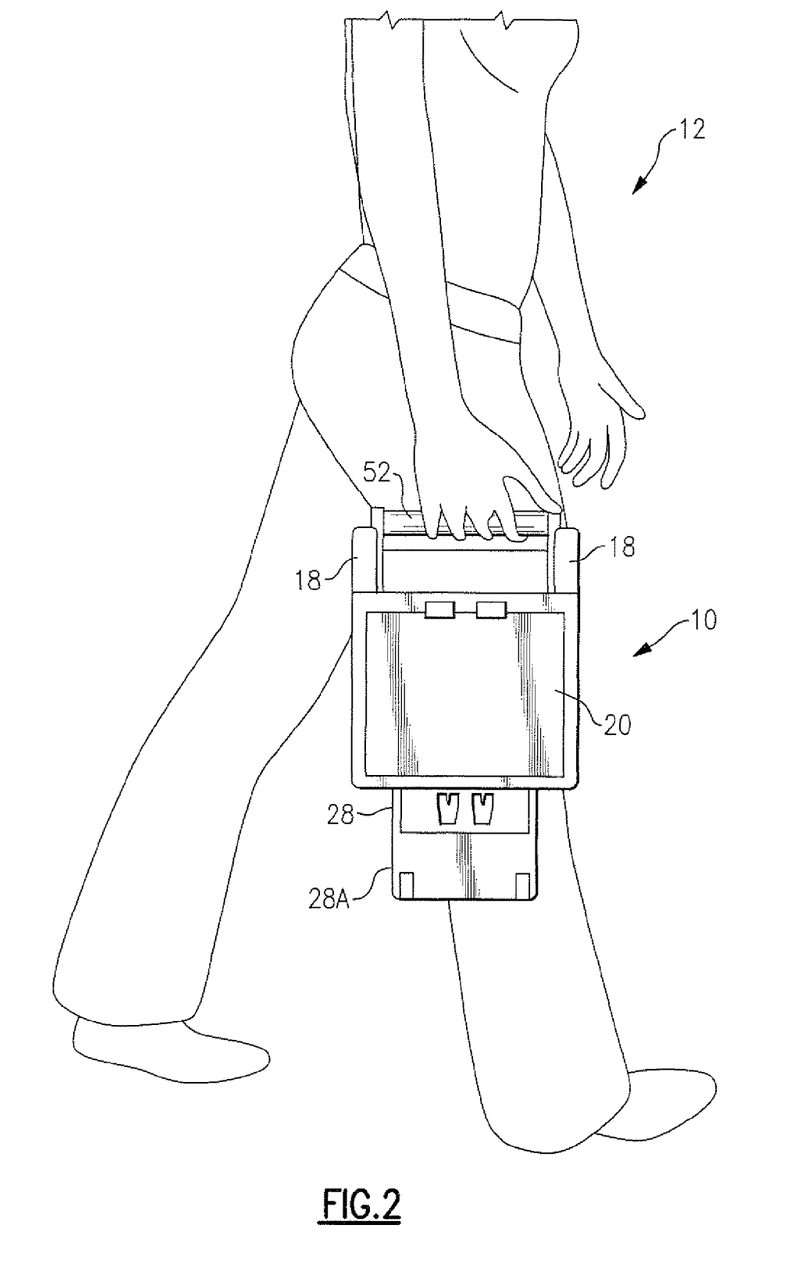
FIG. 2 is a perspective view of a shopper carrying the tote in its stored condition.

One or more hooks 60 are provided on vertical support 28. As stated above, the term "hooks" is to be construed broadly to include any type of handle suspension element that is capable of allowing a handle of a bag to be suspended thereon (e.g. spring clasps). In the embodiment of FIGS. 1-7B, hooks 60 are straight elements which are recessed within respective hook openings formed in top and middle vertical support sections 28B, 28C. In this embodiment, two rows of three hooks each are provided on middle section 28B and three hooks 60 are provided in a single row on top section 28C. It is understood, however, that hooks 60 may be arranged in any desired number and manner on any part of vertical support 28. As seen in FIG. 1, multiple bags 14 may be suspended from any one of or all hooks 60 provided on vertical support 28. Since the bags hang close to vertical support 28, the load is maintained along the vertical support which aids in maintaining stability of the tote when in the standing position. Hooks 60 may be provided on any or all sides (i.e., front, rear, left and right sides) of vertical support 28 which allows the shopper to more evenly distribute the bags and thus the load of the bags about vertical support 28.

Figure 10:
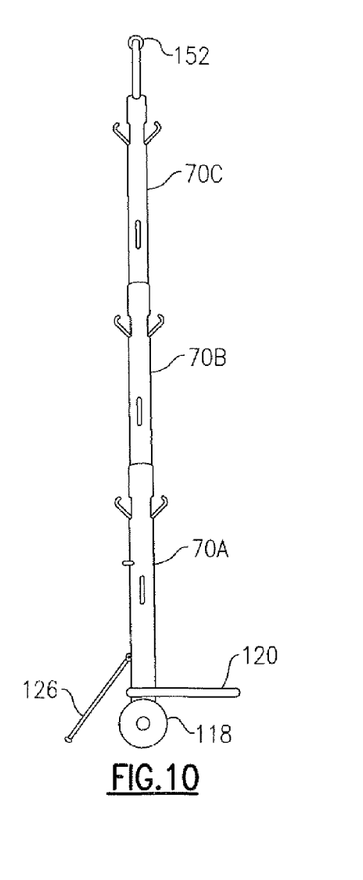
FIG. 10 is a side, elevational view of FIG. 9.
Figure 11:
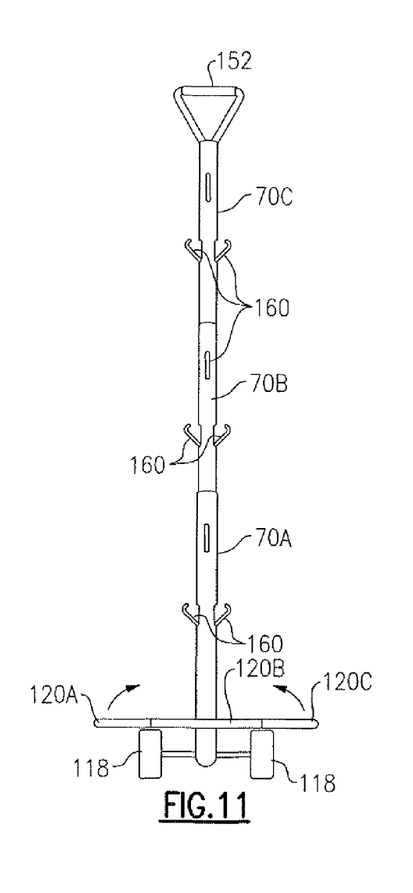
FIG. 11 is a front elevational view thereof.

Another embodiment of the tote is seen in FIGS. 9-12 and is designated generally by the reference numeral 70. Tote 70 includes a vertical support comprising a single shaft 72 that may be provided in two or more sections 70A, 70B and 70C that may retract and telescope one within another when changing the tote 70 to the storage condition which results in a reduction in length of the vertical support as seen in FIG. 11. Means other than telescoping may be employed to reduce the vertical support to the storage condition such as folding of the sections about hinged connectors or providing an elastic cord running through the sections which may be releasably connected together by frictional connecting collars such as is used in some tent constructions, for example.

One or more hooks 160 may be provided on one or each section 70A-C in any arrangement and position therealong.

Hooks 160 may be spring loaded and arranged such that they automatically retract within respective hook openings formed in sections 70A-C upon telescoping section 70C into section 70B, and telescoping section 70B into section 70A. When the sections are extended into the use condition, they automatically extend to a a position allowing a bag handle to be suspended therefrom.

Any hooks on bottom section 70A may have a releasable lock mechanism that allows the shopper to push the hook into section 70A whereupon it locks in place. When it is desired to extend the hooks, the shopper simply presses again upon the recessed hook which thereby extends the hook, for example in the same manner as a magnetic or spring latch.

Figures 8, 9:
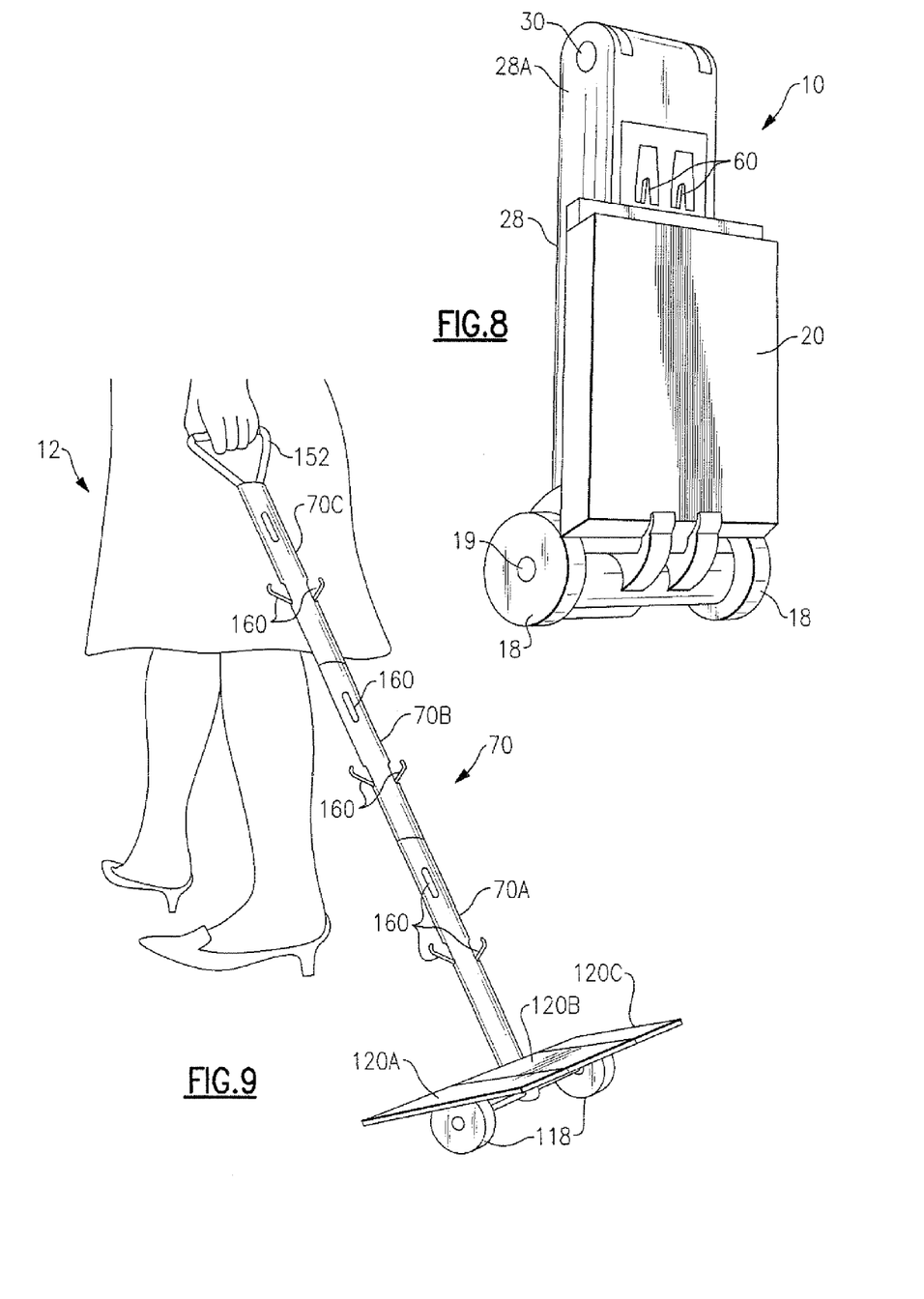
FIG. 8 is a front perspective view of FIG. 6.
FIG. 9 is another embodiment of the tote in the in-use condition being wheeled behind a shopper.
Figure 12:
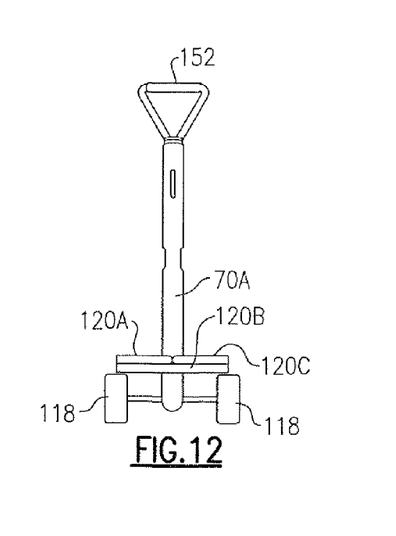
FIG. 12 is the view of FIG. 11 showing the tote in a folded condition.

Platform 120 maybe provided in two or more sections 120A-C which are foldable or otherwise adjustable with respect to each other such that they can be moved between the fully open position seen in FIGS. 9-11, and the fully closed position seen in FIG. 12. For example, sections 120A and 120C may pivot with respect to center section 120B such that they may fold onto one another in the direction of the arrows in FIG. 10. This may be done when changing the tote 70 to the storage condition, or when it is desired to have a smaller size platform due to space constraints (e.g., narrow shopping aisles).

A rear stabilizing leg 126 may be provided to assist in stabilizing tote 70 in the standing position as seen in FIG. 9. Although not shown in the embodiment of FIGS. 9-12, front stabilizing legs may be provided to stabilize platform such as legs 24 as seen in the embodiment of FIGS. 1-7B.

Figures 13, 14:
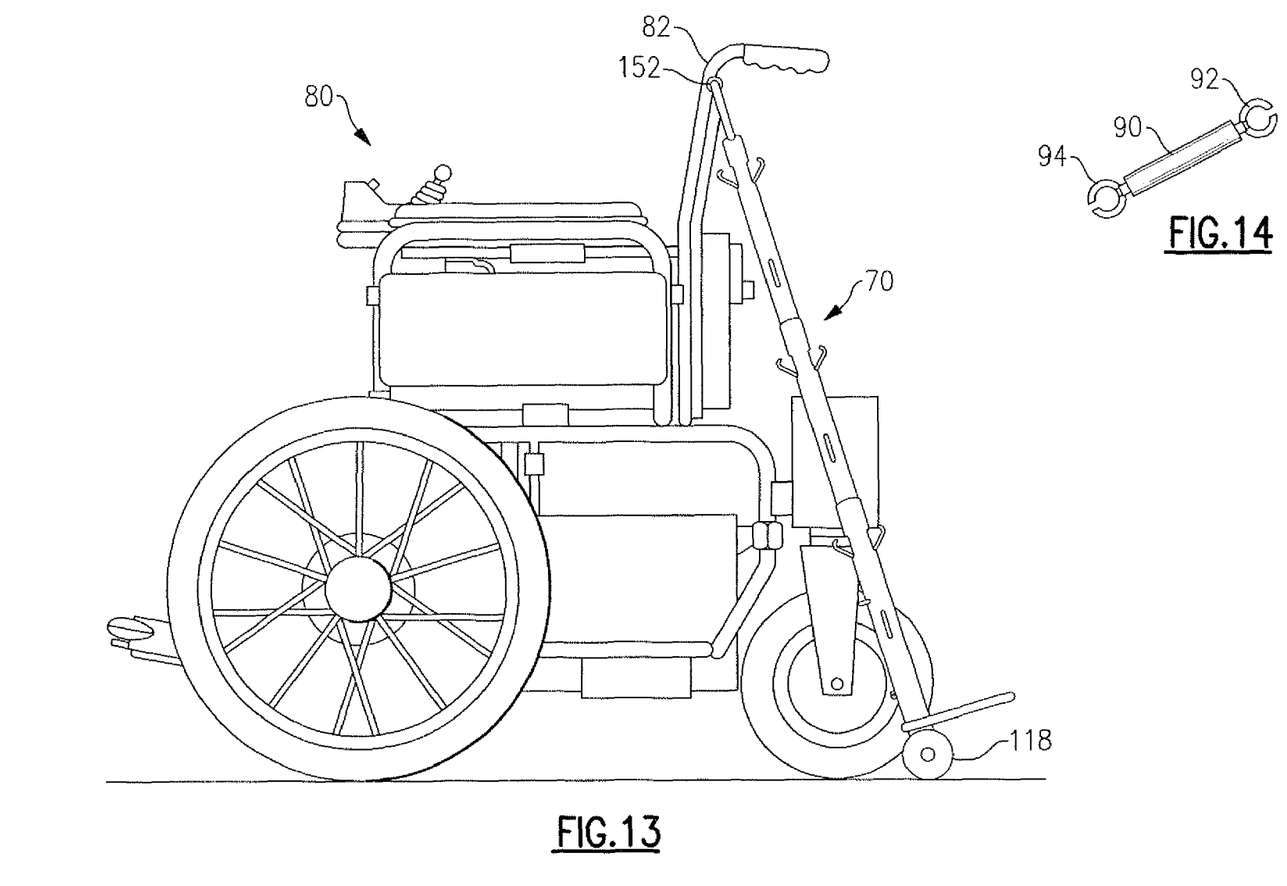
FIG. 13 is a side elevational view showing the tote of FIGS. 9-12 attached to a wheelchair.
FIG. 14 is a perspective view of a releasable attachment mechanism.

Referring to FIG. 13, tote 70 may be removably attached to wheelchair 80 and be rolled along with a shopper in the wheelchair. The tote handle 152 may be secured to any part of the wheelchair with handle 152 being shown attached to the wheelchair handle 82 in FIG. 13, for example. Any suitable attachment component may be used to secure the tote to the wheelchair for example a short, rigid bar 90 having spring-loaded clamps 92, 94 at either end thereof to secure the wheelchair handle 82 (or other part thereof) to the tote handle 152 (or other part thereof), respectively, as seen in FIG. 14. Although not shown, the tote may be removably attached to any other type of wheeled device such as a baby stroller, for example.

Although the invention has been shown and described with regard to just two possible embodiments thereof, it is understood that various modifications may be made thereto without departing from the full spirit and scope of the invention as defined in the claims which follow.

What is claimed is:

1. A shopping tote comprising:
   a) at least one wheel;
   b) a vertical support connected to said wheel, said vertical support having two or more telescoping sections movable between an extended, in-use condition and a retracted, storage condition; and
   c) one or more handle suspension elements mounted directly on said vertical support, said one or more handle suspension elements being arranged to allow suspending of a shopping bag handle therefrom when said vertical support is moved to its extended, in-use condition;
   wherein said one or more handle suspension elements automatically retract within said vertical structure upon moving said vertical support to said storage condition, and automatically extend from said vertical support structure upon moving said vertical support structure to said extended, in-use condition.

2. The shopping tote of claim 1, wherein said one or more handle suspension elements comprise spring-loaded hooks.

3. The shopping tote of claim 2, wherein said one or more handle suspension elements each include a releasable lock mechanism operable to allow a user to selectively lock said handle suspension element within said vertical support structure when in said extended, in-use condition.

4. A shopping tote comprising:
   a) at least one wheel;
   b) a vertical support connected to said wheel; and
   c) one or more handle suspension elements provided on said vertical support, said one or more handle suspension elements being arranged to allow suspending of a shopping bag handle therefrom;
   wherein said one or more handle suspension elements comprise one or more hooks, respectively, said one or more hooks being non-movably recessed within respective hook openings formed in said vertical support, said one or more recessed hooks being accessible to allow suspending of a shopping handle therefrom.

5. A shopping tote comprising:
   a) at least one wheel;
   b) a vertical support connected to said wheel, said vertical support including a bottom section having a tongue attached to a middle section having a groove, said bottom section having a central opening into which said middle section may be slidingly received, said tongue and groove providing a track along which said sections may slide with respect to each other such that said middle section may be alternately moved into and out of said central opening; and
   c) one or more handle suspension elements provided on and recessed within a respective opening in said vertical support, said one or more handle suspension elements being arranged and accessible to allow suspending of a shopping bag handle therefrom.

* * * * *